US012544801B2

(12) United States Patent
Zhu et al.

(10) Patent No.: US 12,544,801 B2
(45) Date of Patent: Feb. 10, 2026

(54) FRUIT AND VEGETABLE SORTING AND CONVEYING DEVICE AND FRUIT AND VEGETABLE SORTING APPARATUS

(71) Applicant: REEMOON TECHNOLOGY CO., LTD., Ganzhou (CN)

(72) Inventors: Er Zhu, Ganzhou (CN); Yi Zhu, Ganzhou (CN)

(73) Assignee: REEMOON TECHNOLOGY CO., LTD., Ganzhou (CN)

( * ) Notice: Subject to any disclaimer, the term of this patent is extended or adjusted under 35 U.S.C. 154(b) by 16 days.

(21) Appl. No.: 18/948,644

(22) Filed: Nov. 15, 2024

(65) Prior Publication Data
US 2025/0073757 A1    Mar. 6, 2025

Related U.S. Application Data

(63) Continuation of application No. PCT/CN2023/111288, filed on Aug. 4, 2023.

(30) Foreign Application Priority Data

Sep. 14, 2022    (CN) .......................... 202222434355.4

(51) Int. Cl.
*B07C 5/36*    (2006.01)
*B07C 5/16*    (2006.01)
*B65G 13/02*    (2006.01)

(52) U.S. Cl.
CPC ................. *B07C 5/36* (2013.01); *B07C 5/16* (2013.01); *B65G 13/02* (2013.01); *B65G 2201/0211* (2013.01)

(58) Field of Classification Search
CPC ..... B07C 5/16; B07C 5/342; B07C 2501/009; B65G 2201/0211
(Continued)

(56) References Cited

U.S. PATENT DOCUMENTS 4,482,061 A    11/1984  Leverett
5,183,151 A *  2/1993  Powell, Jr. ............. B65G 17/32
                                                    198/803.14
(Continued)

FOREIGN PATENT DOCUMENTS

CN         1281413 A    1/2001
CN       101658843 A    3/2010
(Continued)

OTHER PUBLICATIONS

Zhu; Er, "Fruit Cup for Sorting Fruits" (English Translation), Jun. 11, 2021, worldwide.espacenet.com (Year: 2021).*
(Continued)

*Primary Examiner* — Molly K Devine
(74) *Attorney, Agent, or Firm* — IPro, PLLC; Na Xu

(57) ABSTRACT

A fruit and vegetable sorting and conveying device includes a roller assembly, a support bracket and a base. The roller assembly is positioned on the support bracket. The support bracket is movably connected to the base. The support bracket and the roller assembly are cooperatively configured to carry fruit and vegetable. The roller assembly is also configured to make the fruit and vegetable rotate. The support bracket includes a support portion and two mounting arms. Two ends of the support portion are connected to the two mounting arms respectively. The roller assembly is positioned between the two mounting arms. Each mounting arm includes an avoidance step. The avoidance step is configured to allow a strip brush to extend thereinto to reduce a relative distance between an end of the strip brush and an axis of the roller assembly.

4 Claims, 5 Drawing Sheets

(58) Field of Classification Search
USPC .......................................................... 209/509
See application file for complete search history.

(56) References Cited

U.S. PATENT DOCUMENTS

2001/0032807 A1    10/2001  Powell
2006/0151289 A1     7/2006  Kennedy

FOREIGN PATENT DOCUMENTS

| CN | 203578229 U |  5/2014 |
| CN | 203578231 U |  5/2014 |
| CN | 208800413 U |  4/2019 |
| CN | 210364523 U |  4/2020 |
| CN | 112934721 A |  6/2021 |
| CN | 113479567 A | 10/2021 |
| CN | 218079107 U | 12/2022 |
| FR |   2682941 A1 |  4/1993 |

OTHER PUBLICATIONS

International Search Report of PCT Patent Application No. PCT/CN2023/111288 on Nov. 2, 2023.

\* cited by examiner

FRUIT AND VEGETABLE SORTING AND CONVEYING DEVICE AND FRUIT AND VEGETABLE SORTING APPARATUS

CROSS-REFERENCE TO RELATED APPLICATIONS

The present application is a continuation of International Application No. PCT/CN2023/111288, filed on Aug. 4, 2023, which claims priority of Chinese Patent Application No. 202222434355.4, filed on Sep. 14, 2022, titled "FRUIT AND VEGETABLE SORTING AND CONVEYING DEVICE AND FRUIT AND VEGETABLE SORTING APPARATUS", the contents of which are incorporated herein by reference.

TECHNICAL FIELD

The present application relates to the technical field of fruit and vegetable apparatus, and in particular, relates to a fruit and vegetable sorting and conveying device and a fruit and vegetable sorting apparatus.

BACKGROUND

Fruits and vegetables are usually picked and sorted after they have ripened, in order to select fruits and vegetables of different qualities. Fruit and vegetable sorting apparatus usually clamps a conveying device for conveying fruits and vegetables on a conveying belt, in order to convey fruits and vegetables through the conveying device and carry out a series of sorting operations.

In related art, a gap defined between the conveying device and a strip brush is too large, which is likely to cause the fruits and vegetables to fall into the gap between the conveying device and the strip brush, so as to lose the fruits and vegetables.

SUMMARY

An embodiment of the present application provides a fruit and vegetable sorting and conveying device. The fruit and vegetable sorting and conveying device includes a roller assembly, a support bracket and a base;
  the roller assembly is positioned on the support bracket, the support bracket is movably connected to the base, the support bracket and the roller assembly is cooperatively configured to carry fruit and vegetable, the roller assembly may also be configured to make the fruit and vegetable rotate;
  the support bracket includes a support portion and two mounting arms, two ends of the support portion are connected to the two mounting arms respectively, the roller assembly is positioned between the two mounting arms, each mounting arm includes an avoidance step, the avoidance step is configured to allow a strip brush to extend thereinto to reduce a relative distance between an end of the strip brush and an axis of the roller assembly.

Another embodiment of the present application provides a fruit and vegetable sorting apparatus including the fruit and vegetable sorting and conveying device of the above embodiment.

BRIEF DESCRIPTION OF THE DRAWINGS

In order to more clearly illustrate the technical solutions of the embodiments of the present application, the accompanying drawings to be used in the embodiments will be briefly introduced below, and it should be understood that the following accompanying drawings only show certain embodiments of the present application, and therefore should not be regarded as a limitation of the protective scope, and that, for the person of ordinary skill in the art, other relevant accompanying drawings can be obtained based on these drawings without creative labor.

DETAILED DESCRIPTION

Figure 1:
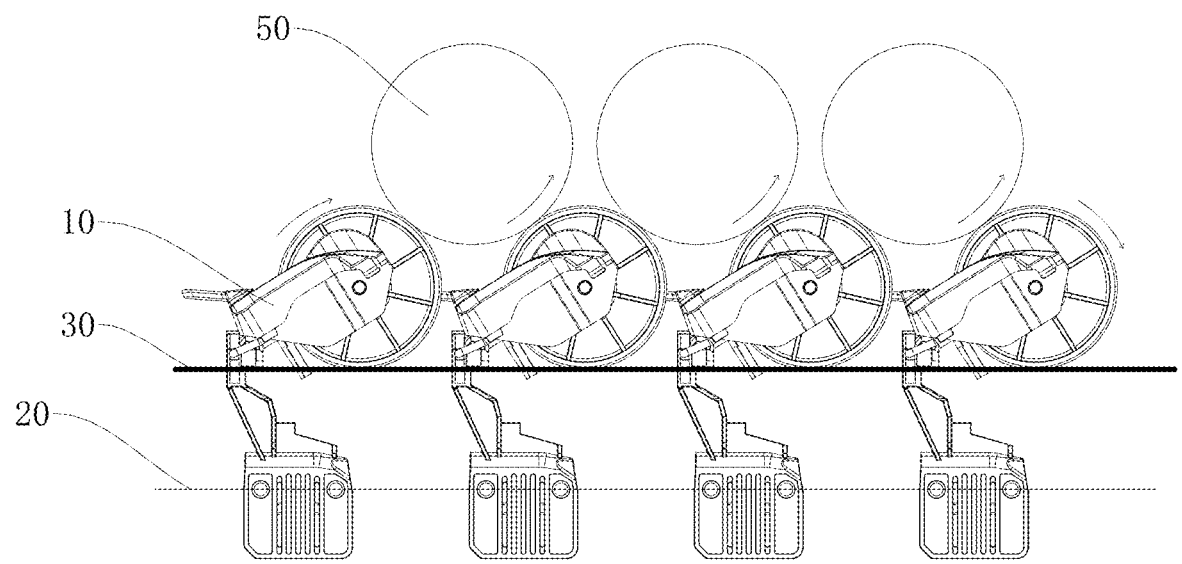
FIG. 1 is a schematic view of a plurality of fruit and vegetable sorting and conveying devices according to an embodiment of the present application.
Figure 2:
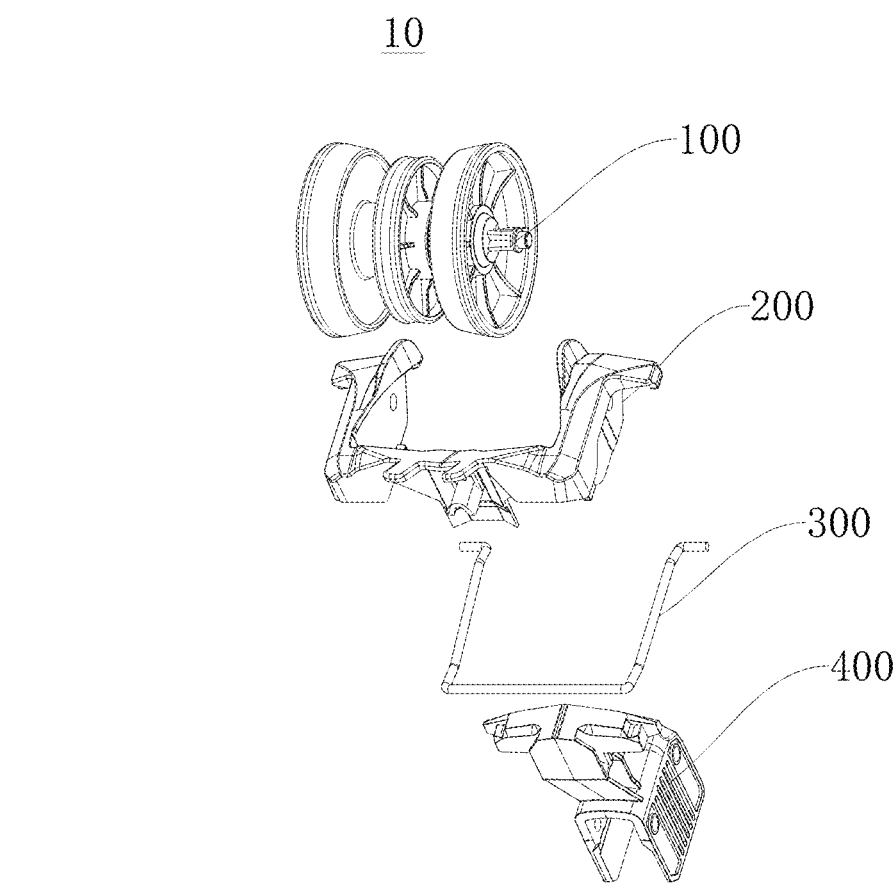
FIG. 2 is an exploded view of a fruit and vegetable sorting and conveying device according to the embodiment of the present application.
Figure 3:
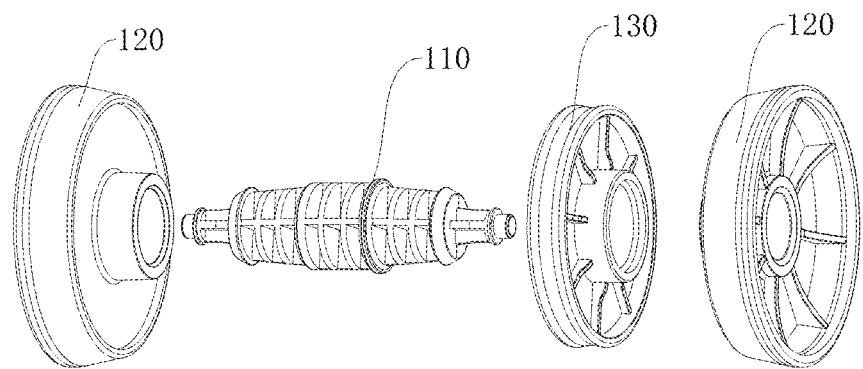
FIG. 3 is a structural schematic view of a roller assembly according to the embodiment of the present application.
Figure 4:
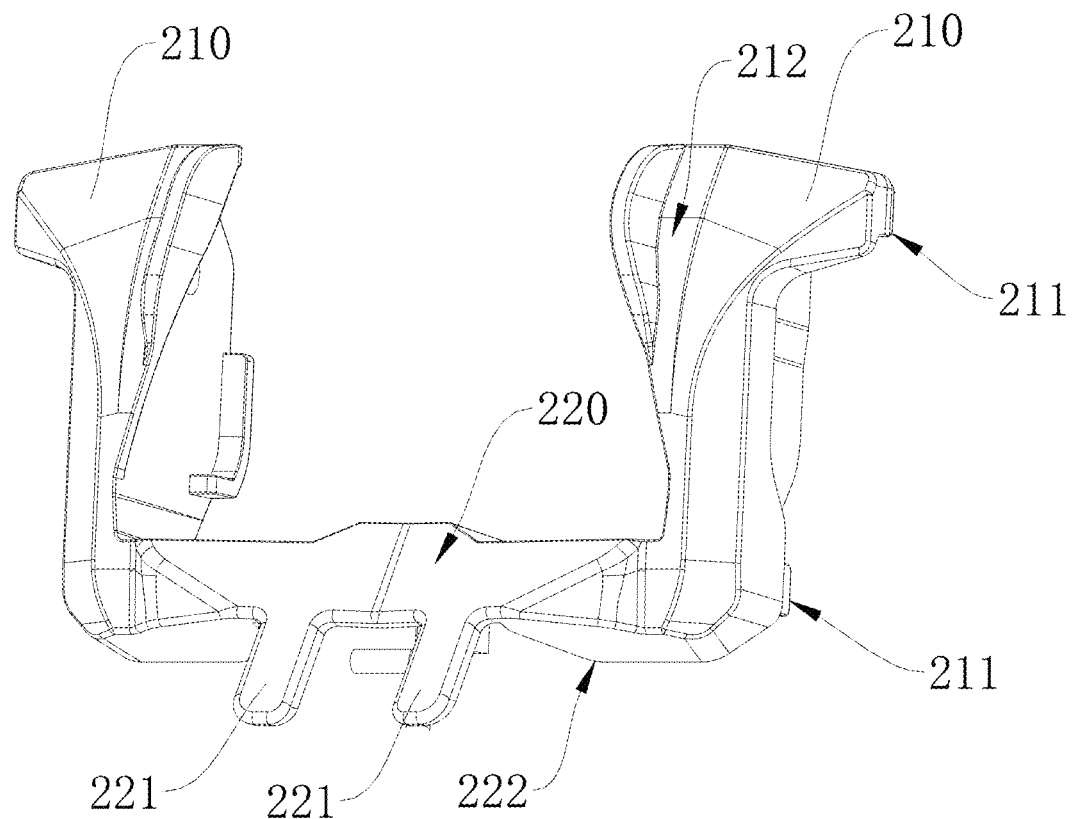
FIG. 4 is a structural schematic view of a support bracket according to the embodiment of the present application.
Figure 5:
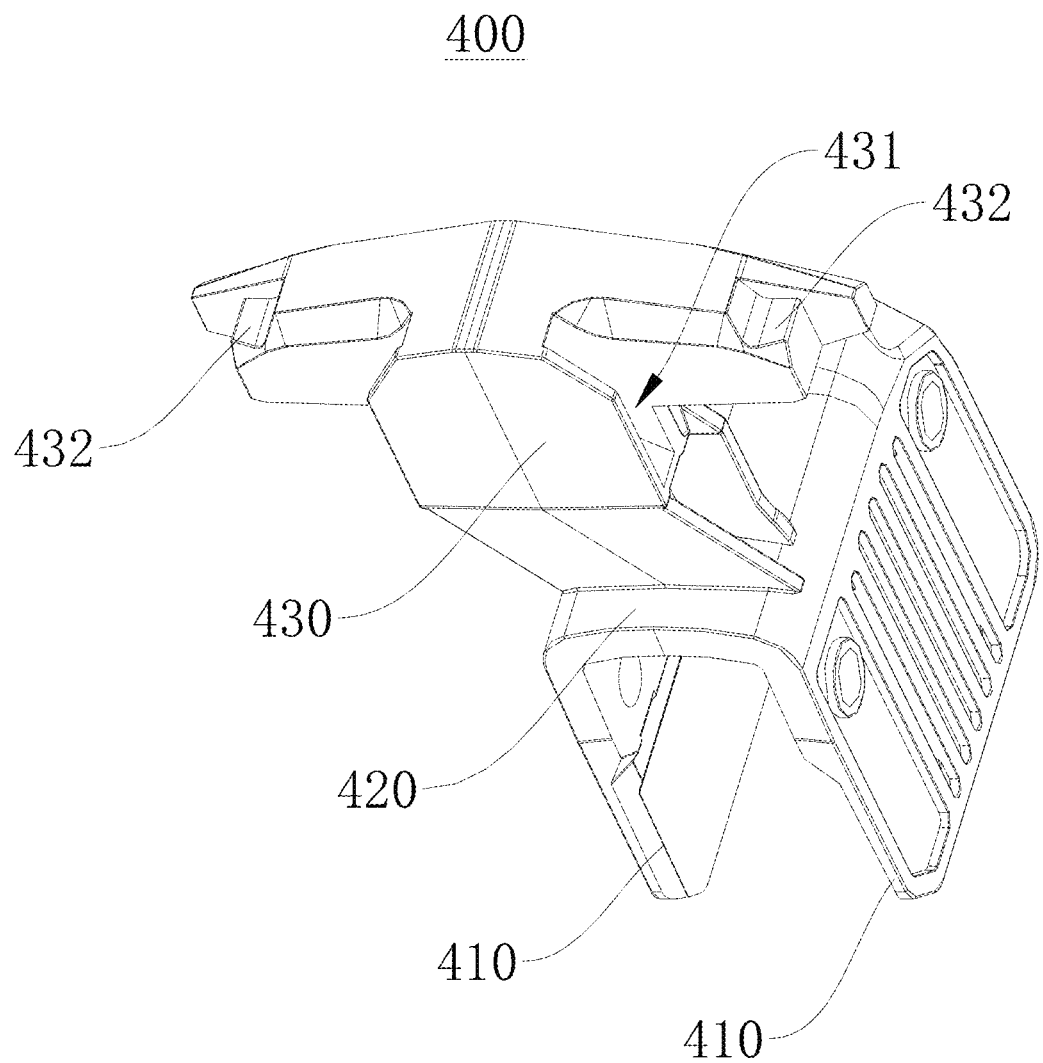
FIG. 5 is a structural schematic view of a base according to the embodiment of the present application.

In order to make the purpose, technical solutions and advantages of the embodiments of the present application clearer, the technical solutions in the embodiments of the present application will be described clearly and completely in conjunction with the accompanying drawings in the embodiments of the present application, and it is clear that the embodiments described are a part of the embodiments of the present application, and not all of the embodiments. The components of embodiments of the present application generally described and illustrated in the accompanying drawings herein may be arranged and designed in a variety of different configurations.

Accordingly, the following detailed description of embodiments of the present application provided in the accompanying drawings is not intended to limit the scope of the present application for which protection is claimed, but rather represents only selected embodiments of the present application. Based on the embodiments in this application, all other embodiments obtained by a person of ordinary skill in the art without creative labor fall within the protective scope of this application.

It should be noted that similar reference numbers and letters denote similar components in the following accompanying drawings, and therefore, once a component is defined in an accompanying drawing, no further definition or explanation of it is required in the subsequent accompanying drawings.

In the description of this application, it should be noted that orientations or positional relationships indicate by the terms "center", "up", "down", "left", "right", "vertical", "horizontal", "inside", "outside", etc., are based on the orientations or positional relationships shown in the accompanying drawings, or the customary orientations or positional relationships in the use of the product of this application, and are only intended to facilitate and simplify the description of this application, and do not indicate or imply that the device or element referred to must have a particular orientation, be constructed and operate in a particular orientation, and therefore, it is not to be construed as a limitation of this application. In addition, the terms "first", "second", "third", etc. are used only for the purpose of differentiating descriptions and are not to be construed as indicating or implying relative importance.

Furthermore, the terms "horizontal", "vertical", etc. do not mean that the parts are required to be absolutely horizontal or overhanging, but may be slightly inclined. For example, "horizontal" simply means that its orientation is more horizontal as compared to "vertical", and does not mean that the structure must be absolutely horizontal, but may be slightly inclined.

In the description of the present application, it should also be noted that the terms "set up", "mounted", "connected with each other" and "connected" shall be understood in a broad sense unless otherwise expressly specified and limited, for example, it may be a fixed connection, a removable connection, or a connection in one piece; it may be a mechanical connection or an electrical connection; it may be a direct connection or an indirect connection through an intermediate medium, and it may be a connection within two elements. For a person of ordinary skill in the art, the specific meaning of the above terms in this application may be understood on a case-by-case basis.

The present application provides a fruit and vegetable sorting apparatus configured to carry out a sorting process of picked fruits and vegetables, which is particularly suitable for sorting fruits with good sorting effect and high efficiency.

Figure 6:
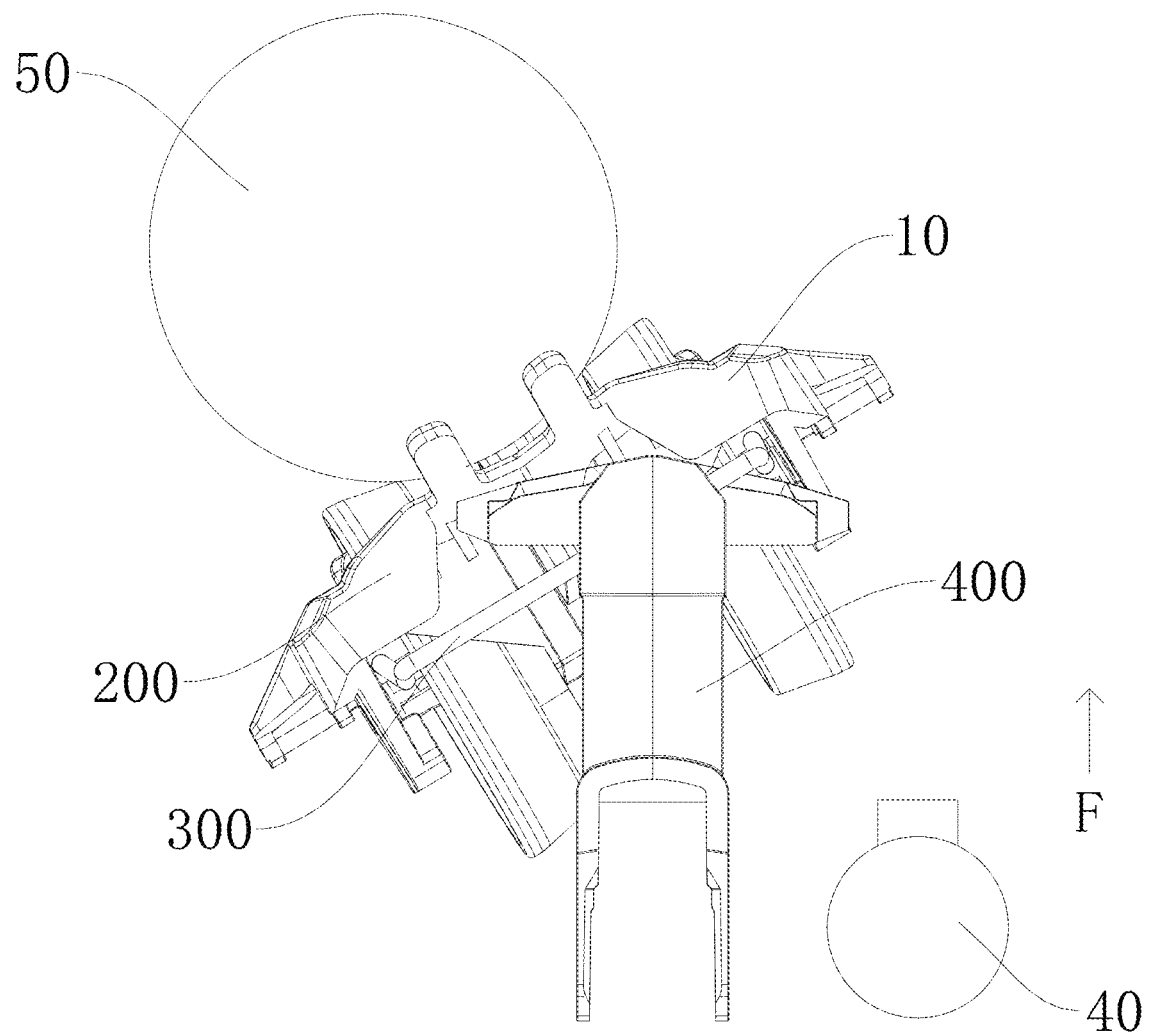
FIG. 6 is a schematic view of a fruit unloading state according to the embodiment of the present application.
Figure 7:
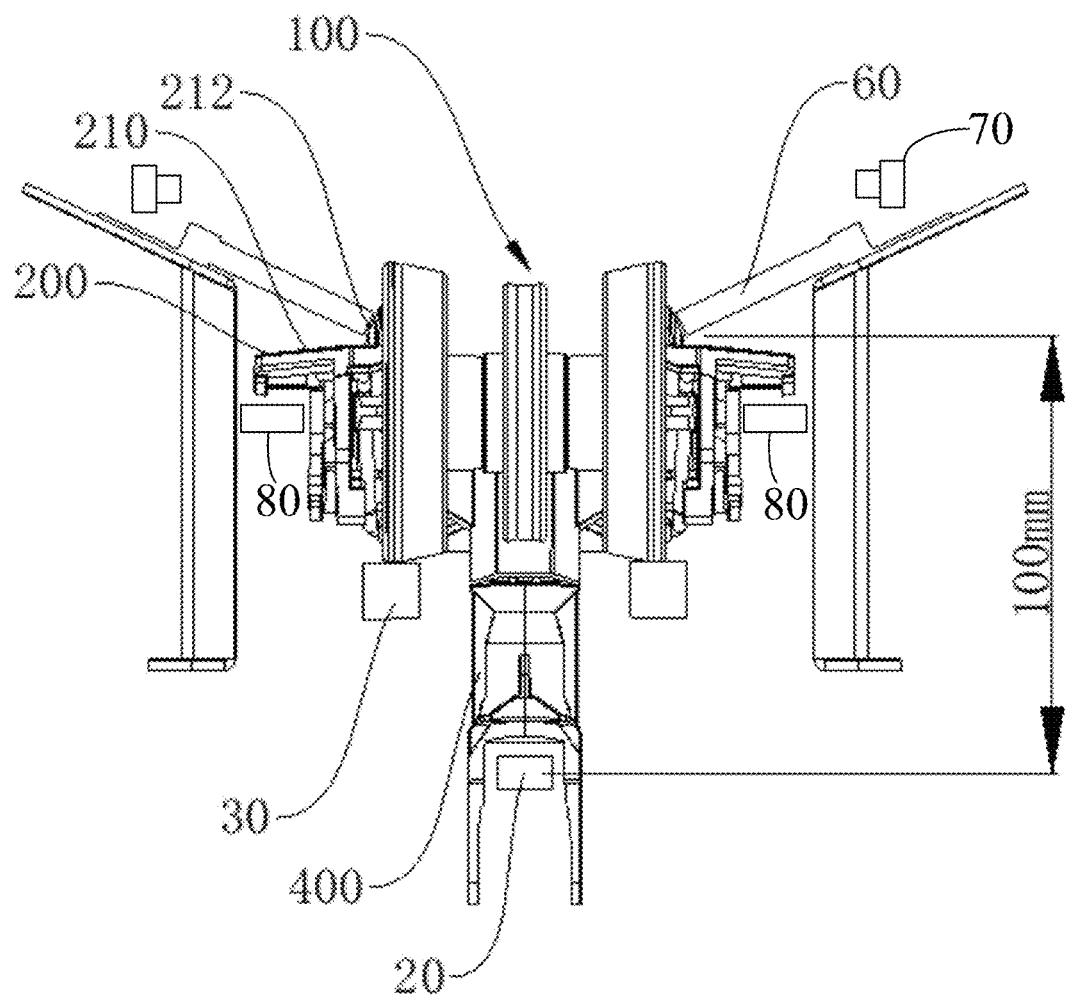
FIG. 7 is another structural schematic view of the support bracket according to the embodiment of the present application.

Referring to FIGS. 1, 6 and 7, the fruit and vegetable sorting apparatus includes a plurality of fruit and vegetable sorting and conveying devices 10, a conveying belt 20, a roller track 30, a detection device 70, a weighing device 80, and a fruit unloading device 40, etc.

In this embodiment, the plurality of fruit and vegetable sorting and conveying devices 10 clamps the conveying belt 20. The conveying belt 20 drives the fruit and vegetable sorting and conveying devices 10 carrying the fruits and vegetables 50 to carry out the sorting process. The roller track 30, the detection device 70, the weighing device 80 and the fruit unloading device 40 are located around the conveying belt 20. The detection device 70 is configured to detect outer skin of the fruits and vegetables 50 carried by the fruit and vegetable sorting and conveying devices 10. The weighing device 80 is configured to weigh the fruits and vegetables 50 carried by the fruit and vegetable sorting and conveying devices 10. The fruit unloading device 40 is configured to unload the fruits and vegetables 50 carried by the fruit and vegetable sorting and conveying devices 10.

Alternatively, referring to FIGS. 2 to 5, each fruit and vegetable sorting and conveying device 10 of the present application includes a roller assembly 100, a support bracket 200, a connection member 300 and a base 400.

Wherein, the roller assembly 100 is positioned on the support bracket 200, the support bracket 200 is movably connected to the base 400 via the connection member 300, and the support bracket 200 and the roller assembly 100 are cooperatively configured to carry the fruit and vegetable 50.

In this embodiment, the base 400 includes a reinforcing portion 420 and two opposite clamping portions 410, the clamping portions 410 clamp the conveying belt 20, such that the fruit and vegetable sorting and conveying device 10 follows the movement of the conveying belt 20. The reinforcing portion 420 is connected to top parts of the two clamping portions 410, increasing the yield strength of the base 400, greatly improving the clamping force of the clamping portions 410 applied to the conveying belt 20, avoiding the fruit and vegetable sorting and conveying device 10 from shaking or even falling due to insufficient clamping force of the clamping portions 410 during the process of conveying the fruit and vegetable 50, avoiding the fruit and vegetable 50 from being damaged due to falling, and ensuring that the sorting process of the fruit and vegetable 50 is successfully completed under the transmission of the fruit and vegetable sorting and conveying device 10.

Specifically, the reinforcing portion 420 and the two clamping portions 410 are integrally molded and jointly form a U-shape, which further increases the structural strength and the yield strength of the base 400, and ensures that the clamping portions 410 can stably clamp the conveying belt 20.

In practice, the roller assembly 100 is also configured to rotate the fruit and vegetable 50. The roller track 30 and the detection device 70 are positioned at the beginning section of the conveying belt 20. The roller assembly 100 is positioned on the roller track 30 while the base 400 is clamping the conveying belt 20. In this state, each fruit and vegetable 50 is placed between the roller assemblies 100 of two adjacent fruit and vegetable sorting and conveying devices 10 and rotates following the two adjacent roller assemblies 100. During the rotation of the fruit and vegetable 50, the outer skin of the fruit and vegetable 50 is visually inspected in all directions by the detection device 70 to collect image information of the outer skin of the fruit and vegetable 50.

Of course, in other embodiments, in the case where the fruit and vegetable 50 is carried on the support bracket 200 and the roller assembly 100 of a same fruit and vegetable sorting and conveying device 10, the roller assembly 100 may still drive the fruit and vegetable 50 to rotate under the drive of the roller track 30.

Alternatively, the roller assembly 100 includes a rotation shaft 110, two first rollers 120 and a second roller 130, the two first rollers 120 and the second roller 130 are positioned on the rotation shaft 110, the rotation shaft 110 is rotatably connected to the support bracket 200, the second roller 130 is positioned between the two first rollers 120, and the two first rollers 120 and the second roller 130 are cooperatively configured to support the fruit and vegetable 50 or cause the fruit and vegetable 50 to rotate.

In this embodiment, two ends of the rotation shaft 110 are respectively connected to two mounting arms of the support bracket 200, and the two first rollers 120 can be rotated under the driving of the roller track 30, in order to drive the second roller 130 to rotate, thereby driving the fruit and vegetable 50 to rotate, so as to facilitate all directional image collection of the outer skin of the fruit and vegetable 50.

Alternatively, a diameter of each first roller 120 is larger than a diameter of the second roller 130, and the two first rollers 120 are configured to rotate under the driving of the roller track 30 to drive the fruit and vegetable 50 to rotate.

In this embodiment, the diameter of the second roller 130 is smaller than the diameter of each first roller 120, so as to fit the shape of the fruit and vegetable 50 and improve the rotating effect of the fruit and vegetable 50.

Alternatively, the support bracket 200 includes a support portion 220 and two mounting arms 210, two ends of the support portion 220 are respectively connected to the two mounting arms 210, the roller assembly 100 is positioned between the two mounting arms 210, and each mounting arm 210 includes an avoidance step 212, and the avoidance step 212 is configured to allow a strip brush 60 to extend thereinto, so as to reduce a relative distance between an end of the strip brush 60 and an axis of the roller assembly 100.

In this embodiment, the avoidance step 212 is positioned on each mounting arm 210 and allows the strip brush 60 to extend thereinto, which effectively reduces the distance between the end of the strip brush 60 and the axis of the roller assembly 100, i.e., the distance between the rotation shaft 110 of the first rollers 120 and the end of the strip brush 60, in the case that a size of the fruit and vegetable sorting and conveying device 10 is determined, a height of the strip brush 60 in the vertical direction is effectively reduced, thereby reducing the distance between the strip brush 60 and the roller assembly 100 in the vertical direction, such that the fruit and vegetable 50 can be effectively avoided from getting stuck into the gap between the strip brush 60 and the roller assembly 100, thereby ensuring that the fruit and vegetable sorting and conveying device 10 stably conveys the fruit and vegetable 50, avoiding the fruit and vegetable 50 from being damaged due to falling, and ensuring that the sorting process of the fruit and vegetable 50 is successfully completed under the transmission of the fruit and vegetable sorting and conveying device 10.

Specifically, the distance between the avoidance step 212 and the conveying belt 20 clamped by the clamping portions 410 is 100 mm (as shown in FIG. 7).

Alternatively, the mounting arms 210 are movably connected to the base 400 via the connection member 300.

In this embodiment, the support portion 220 and the two mounting arms 210 jointly form a U-shape, the support portion 220 is supported on the top part of the base 400, and the mounting arms 210 are movably connected to the base 400 via the connection member 300 to allow the support bracket 200 to be movably connected to the base 400.

It is to be noted that the roller assembly 100, driven by the roller track 30, can cause the roller assembly 100 and the support bracket 200 to rotate relative to the base 400 through the connection member 300, specifically, causing the roller assembly 100 and the support bracket 200 to rotate 35 degrees relative to the base 400, and in such a state, the distance between the strip brush 60 and the conveying belt 20 can be reduced by 10 mm under the avoidance of the avoidance step 212, and greatly reducing the risk of the fruit and vegetable 50 from getting stuck in the gap between the strip brush 60 and two neighboring fruit and vegetable sorting and conveying devices 10 during operation.

Alternatively, the support portion 220 includes two protruding portions 221 positioned spaced apart, and the two protruding portions 221 and the roller assembly 100 are cooperatively configured to carry the fruit and vegetable 50.

In this embodiment, the two protruding portions 221 and the roller assembly 100 contact multiple parts of the fruit and vegetable 50 respectively, increasing the contact area between the support bracket 200 and the fruit and vegetable 50, thereby enhancing the attachment effect of the support bracket 200 and the roller assembly 100 on the fruit and vegetable 50. In addition, by providing the protruding portions 221, the chance of collision between the fruit and vegetable 50 and the support bracket 200 during transmission of the fruit and vegetable 50 by the fruit and vegetable sorting and conveying device 10 is reduced, and damage to the fruit and vegetable 50 is reduced.

Alternatively, the base 400 further includes a connection portion 430, the connection portion 430 is positioned on a top part of the reinforcing portion 420, the connection portion 430 defines an active cavity 431, the connection member 300 movably passes through the active cavity 431, one end of the connection member 300 is connected to one of the mounting arms 210, and another end of the connection member 300 is connected to another of the mounting arms 210.

In this embodiment, the connection member 300 is U-shaped and adapted to the shape of the support bracket 200. The support bracket 200 is connected to the base 400 by the connection member 300, and the bottom part of the support portion 220 may be snapped onto the base 400 or may be separated from the base 400, and the connection member 300 prevents the support bracket 200 from completely falling off from the base 400 when the support portion 220 is separated from the base 400.

Alternatively, two sides of the top part of the connection portion 430 are each provided with a limit recessed portion 432, and two sides of the bottom part of the support portion 220 are each provided with a limit projection portion 222, and each limit projection portion 222 is embedded in a respective limit recessed portion 432 to enable the support bracket 200 to be snapped onto the base 400.

In this embodiment, two limit projection portions 222 at the two sides of the bottom part of the support portion 220 are respectively embedded in two limit recessed portions 432 at the two sides of the top part of the connection portion 430 to enable the support bracket 200 to be stably mounted on the base 400, avoiding the support bracket 200 from being tilted by uneven force to cause the fruit and vegetable 50 to fall.

In the case where the fruit and vegetable 50 are placed on the support bracket 200, the weight of the fruit and vegetable 50 acts on the support bracket 200 and acts on the limit recessed portion 432 through the limit projection portion 222 on the support bracket 200, thereby making the support bracket 200 be more stably snapped on the base 400 and preventing the support bracket 200 from tipping over a side or even falling off.

It is to be noted that, in the case where the fruit and vegetable 50 is intended to be unloaded, as shown in FIG. 6, a vertical upward force F is usually exerted by the fruit unloading device 40 on one mounting arm 210 of the support bracket 200, such that after the limit projection portions 222 are detached from the limit recessed portions 432, the mounting arm 210 will drive the support bracket 200 to tip over relative to the base 400 toward the side far away from the fruit unloading device 40 by the action of the unloading device 40, so as to make the fruit and vegetable 50 fall off from the support bracket 200, thereby realizing the unloading of the fruit and vegetable 50.

It should be understood that the support bracket 200 is in a tipping over state, the support bracket 200 is connected to the base 400 by the connection member 300, so as to avoid the support bracket 200 from completely detaching from the base 400.

Alternatively, each mounting arm 210 includes a bump 211, and the bump 211 is configured to drive the support bracket 200, the roller assembly 100, and the fruits and vegetables 50 to move vertically upwardly with respect to the base 400 under the supporting action of the weighing device 80, and to cause the support bracket 200 to be separated from the base 400, so as to weigh the support bracket 200, the roller assembly 100, and the fruit and vegetable 50 by the weighing device 80.

In this embodiment, the weighing device 80 is a weighing plate, two weighing plates are positioned on two sides of the two mounting arms 210, and a weight sensor (not shown) is provided on each weighing plate. The fruit and vegetable sorting and conveying device 10 moves to the position of the weighing device 80 driven by the conveying belt 20, and the weighing device 80 is only in contact with the bump 211 on each mounting arm 210, in other words, the support bracket 200, the roller assembly 100, and the fruit and vegetable 50 are carried on the weighing device 80 through the bump 211 on each mounting arm 210. By raising the height of the weighing plate, the roller assembly 100, the support bracket 200, and the fruit and vegetable 50 carried on the support bracket 200 are separated from the base 400, and the weight of the support bracket 200, the roller assembly 100, and the fruit and vegetable 50 are acquired by the weight sensor, and the accurate weight information of the fruit and vegetable 50 is acquired through a series of calculations.

In summary, the present application provides a fruit and vegetable sorting and conveying device 10 and a fruit and vegetable sorting apparatus, the clamping portions 410 are clamping the conveying belt 20, so as to make the fruit and vegetable sorting and conveying device 10 follow the movement of the conveying belt 20. The reinforcing portion 420 is connected to the top parts of the two clamping portions 410, increasing the yield strength of the base 400, greatly improving the clamping force of the clamping portions 410 applied on the conveying belt 20, avoiding the fruit and vegetable sorting and conveying device 10 from shaking or even falling due to the insufficient clamping force of the clamping portions 410 during the transmission of the fruit and vegetable 50, and avoiding the damage of the fruit and vegetable 50 due to the falling, and ensuring that the sorting process of the fruit and vegetable 50 is successfully completed under the transmission of the fruit and vegetable sorting and conveying device 10.

The above are only the exemplary embodiments of the present application, and are not intended to limit the present application, which may be subject to various changes and variations for those skilled in the art. Any modifications, equivalent substitutions, improvements, etc. made within the spirit and principles of this application shall be included in the protective scope of this application.

INDUSTRIAL UTILITY

The present application provides a fruit and vegetable sorting and conveying device and a fruit and vegetable sorting apparatus, and relates to the technical field of fruit and vegetable apparatus. The fruit and vegetable sorting and conveying device includes a roller assembly, a support bracket, and a base. The roller assembly is positioned on the support bracket, the support bracket is movably connected to the base, the support bracket and the roller assembly are cooperatively configured to carry the fruit and vegetable, and the roller assembly is also configured to make the fruit and vegetable rotate. The support bracket includes a support portion and two mounting arms, two ends of the support portion are respectively connected to the two mounting arms, and the roller assembly is positioned between the two mounting arms. Each mounting arm includes an avoidance step configured to allow a strip brush to extend thereinto, in order to effectively reduce the distance between an end of the strip brush and an axis of the roller assembly, thereby effectively reducing the distance between the strip brush and the roller assembly in a vertical direction, thus effectively avoiding the fruit and vegetable from getting stuck in the gap between the strip brush and the roller assembly, thereby ensuring that the fruit and vegetable sorting and conveying device stably conveys the fruit and vegetable, avoiding damage to the fruit and vegetable due to falling, and ensuring that the sorting process of the fruit and vegetable is successfully completed under the transmission of the fruit and vegetable sorting and conveying device.

Furthermore, it should be understood that the fruit and vegetable sorting and conveying device and the fruit and vegetable sorting apparatus of the present application are reproducible and can be used in a variety of industrial applications. For example, the fruit and vegetable sorting and conveying device and the fruit and vegetable sorting apparatus of the present application can be used in the technical field of fruit and vegetable apparatus.

What is claimed is:

1. A fruit and vegetable sorting and conveying device, comprising a roller assembly, a support bracket and a base;
   the roller assembly positioned on the support bracket, the support bracket movably connected to the base, the support bracket and the roller assembly cooperatively configured to carry fruit and vegetable, the roller assembly also configured to make the fruit and vegetable rotate;
   the support bracket comprising a support portion and two mounting arms, two ends of the support portion connected to the two mounting arms respectively, the roller assembly positioned between the two mounting arms, each mounting arm comprising an avoidance step, the avoidance step configured to allow a strip brush to extend thereinto to reduce a relative distance between an end of the strip brush and an axis of the roller assembly, the avoidance step being inclined with respect to the axis of the roller assembly and facing towards the roller assembly.

2. A fruit and vegetable sorting apparatus, comprising a fruit and vegetable sorting and conveying device and strip brushes;
   wherein the fruit and vegetable sorting and conveying device comprises a roller assembly, a support bracket and a base;
   the roller assembly is positioned on the support bracket, the support bracket is movably connected to the base, the support bracket and the roller assembly are cooperatively configured to carry fruit and vegetable, the roller assembly is also configured to make the fruit and vegetable rotate;
   the support bracket comprises a support portion and two mounting arms, two ends of the support portion are connected to the two mounting arms respectively, the roller assembly is positioned between the two mounting arms, each mounting arm comprises an avoidance step, the avoidance step is inclined with respect to an axis of the roller assembly and faces towards the roller assembly, and two avoidance steps of the two mounting arms face each other;
   each strip brush and a corresponding one of the two avoidance steps are located at the same side of the roller assembly and inclined substantially in the same direction with respect to the axis of the roller assembly, and each strip brush extends above the corresponding one of the two avoidance steps to reduce a relative distance between an end of each strip brush and the axis of the roller assembly.

3. The fruit and vegetable sorting apparatus of claim 2, wherein the base comprises two limit recessed portions, the two limit recessed portions are located at two sides of a top part of the base, the support portion comprises two limit projection portions, the two limit projection portions are located at two sides of a bottom part of the support portion, and each limit projection portion is embedded in a respective one of the two limit recessed portions to enable the support bracket to be snapped onto the base.

4. The fruit and vegetable sorting apparatus of claim 2, comprising a conveying belt and a roller track located at a beginning section of the conveying belt, the base clamping the conveying belt, the roller assembly positioned on the roller track, the roller track capable of driving the roller assembly to rotate the fruit and vegetable during the fruit and vegetable sorting and conveying device following the movement of the conveying belt, and causing the roller assembly and the support bracket to rotate 35 degrees relative to the base.

\* \* \* \* \*